United States Patent [19]

Seifert

[11] 4,213,049
[45] Jul. 15, 1980

[54] X-RAY DIAGNOSTIC GENERATOR COMPRISING AN INVERTER FEEDING THE HIGH VOLTAGE TRANSFORMER

[75] Inventor: Gerd Seifert, Spardorf, Fed. Rep. of Germany

[73] Assignee: Siemens Aktiengesellschaft, Berlin & Munich, Fed. Rep. of Germany

[21] Appl. No.: 960,862

[22] Filed: Nov. 15, 1978

[30] Foreign Application Priority Data

Jan. 20, 1978 [DE] Fed. Rep. of Germany ....... 2802505

[51] Int. Cl.² ............................................ H05G 1/30
[52] U.S. Cl. .................................. 250/408; 250/402; 250/413
[58] Field of Search ................ 250/401, 402, 408, 421

[56] References Cited

U.S. PATENT DOCUMENTS 3,320,477  5/1967  Boeker .............................. 250/421

FOREIGN PATENT DOCUMENTS 2443709  3/1976  Fed. Rep. of Germany .

Primary Examiner—Craig E. Church
Assistant Examiner—Thomas P. O'Hare
Attorney, Agent, or Firm—Hill, Van Santen, Steadman, Chiara & Simpson

[57] ABSTRACT

In an exemplary embodiment, an inverter manifests a load output which is capable of being alternately connected, via a switching apparatus with the poles of a d.c. voltage source. Changeover switches are present by means of which the load output can be selectively connected between a midpoint conductor of the d.c. voltage source and the midpoint of a half-bridge formed by the switching apparatus, or into the diagonal of a full-bridge formed by the switching apparatus. The changeover switches for the formation of the half-bridge, parallel-connect two branches of the full-bridge in each instance. By this means, the inverter is capable of being adapted selectively to a high voltage or a high current load.

2 Claims, 7 Drawing Figures

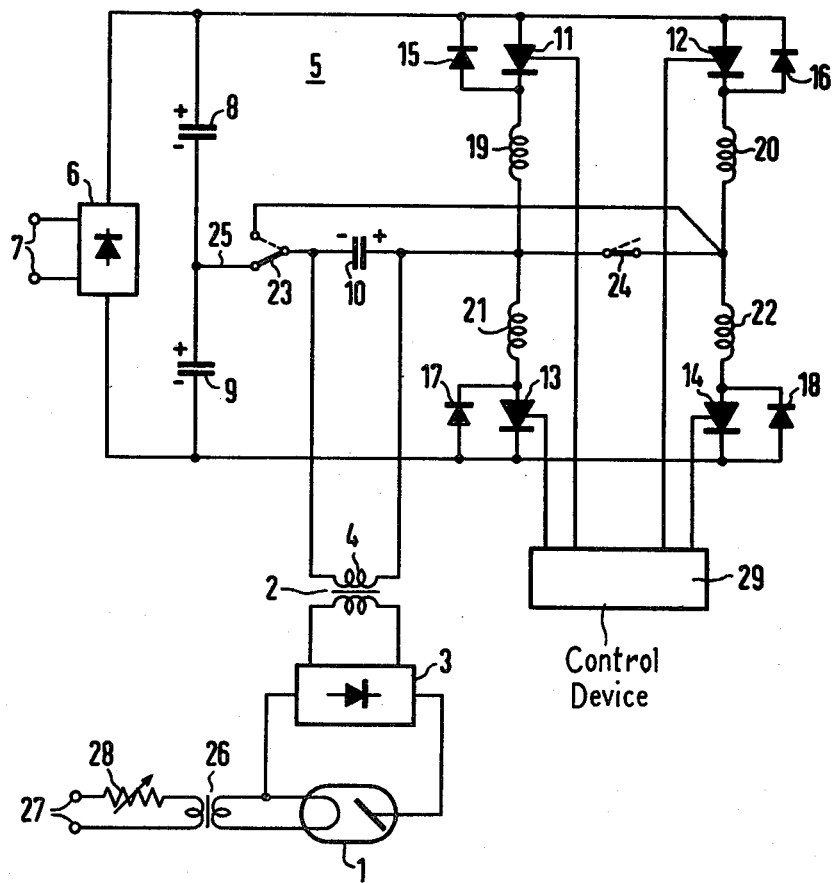

X-RAY DIAGNOSTIC GENERATOR COMPRISING AN INVERTER FEEDING THE HIGH VOLTAGE TRANSFORMER

BACKGROUND OF THE INVENTION

The invention relates to an x-ray diagnostic generator comprising an x-ray tube, a high voltage transformer feeding the x-ray tube, an inverter connected to the input of the high voltage transformer, and a power rectifier feeding the inverter.

In the case of an x-ray diagnostic generator of this type, it is possible to select the feed frequency of the x-ray tube high voltage transformer in the kHz-range; i.e., substantially higher than the mains frequency. On account of this feed frequency, the high voltage transformer can be provided with a substantially smaller and more lightweight construction than in the case of an x-ray diagnostic generator which is operated with the mains frequency. In an x-ray diagnostic generator of this type, the loading of the inverter is not constant; on the contrary, it is dependent upon the selected values for the x-ray tube current and the x-ray tube voltage. In the case of high x-ray tube currents and hence also high load currents of the inverter, a low x-ray tube voltage and hence also a low inverter output voltage is thus present. Conversely, the x-ray tube current and the load current of the inverter are small in the case of high x-ray tube voltages and high inverter output voltages. The switching apparatus of the inverter must be constructed such that it is not endangered by the high load currents occurring in the case of a low voltage, on the one hand, and such that it is not endangered by high voltages occurring in the case of the low load currents, on the other hand.

SUMMARY OF THE INVENTION

The object underlying the invention consists in constructing an x-ray diagnostic generator of the type initially cited such that it is capable of adaptation to varying loads, whereby each individual component of the inverter switching apparatus can be dimensioned for a comparatively low current and voltage loading.

In accordance with the invention, this object is achieved by virtue of the fact that the inverter has a load output which is alternately connectable, via an inverter switching apparatus, with the poles of a d.c. voltage source, and that changeover switching means are present by means of which the load output is selectively connectable between a midpoint conductor of the d.c. voltage source and the midpoint of a half-bridge formed by the inverter switching apparatus, or is selectively connectable into the diagonal of a full-bridge formed by the inverter switching apparatus, whereby the changeover switching means for the formation of the half-bridge parallel-connects two branches of the full-bridge, respectively. With the inventive x-ray diagnostic generator, in the case of a high load current and a low load voltage, a division of the load current into two branches is possible, so that, in the loading of the components of the inverter switching apparatus, a load reduction is provided with respect to the instance wherein the half-bridge for each polarity consists only of one branch. If operation is carried out with high voltage and low load current, then two branches, respectively, of the switching apparatus are connected in series, such that the voltage load of the components of the switching apparatus is reduced by half with respect to the instance wherein operation is carried out with a half-bridge with one branch, respectively, for each polarity.

The invention shall be explained in further detail in the following on the basis of an exemplary embodiment illustrated in the accompanying sheet of drawings; and other objects, features and advantages will be apparent from this detailed disclosure and from the appended claims.

BRIEF DESCRIPTION OF THE DRAWING

The single FIGURE shows a circuit diagram for an exemplary embodiment of the present invention.

DETAILED DESCRIPTION

In the drawing, an x-ray tube 1 is illustrated which is fed by a high voltage transformer 2 via a high voltage rectifier 3. The a.c. voltage for the primary winding 4 of the high voltage transformer 2 is delivered by an inverter 5 which is connected to a mains or power rectifier 6. The mains voltage is supplied to the mains rectifier 6 via terminals 7.

Inverter 5 manifests two capacitors 8, 9 connected in series which are charged with the indicated polarity by mains rectifier 6. The primary winding 4 of the high voltage transformer 2 is alternately connectable by means of thyristors 11, 12, 13, 14, with the poles of capacitors 8, 9. There is connected in anti-parallel fashion with each thyristor 11 through 14 one free-running or bypass diode 15, 16, 17, 18, each, and there is connected in series with each of the thyristors 11 through 14, one inductance 19, 20, 21, 22. A changeover switching means, which manifests switches 23 and 24, renders possible the selective connection of primary winding 4 between the midpoint conductor 25 of the capacitors 8, 9, forming a d.c. voltage source, and the midpoint of the half-bridge formed by the components 11 through 22, or said changeover switching means renders possible the switching into the diagonal of the full-bridge formed by the components 11 through 22. The changeover switching means 23, 24, parallel-connect two branches 11, 15, 19 and 12, 16, 20; and 13, 17, 21 and 14, 18, 22, respectively, of the full bridge for the formation of the half-bridge circuit.

The heating current for the x-ray tube 1 is supplied by a heating transformer 26 which is connected to a feed voltage source connected to the terminals 27. The heating current and hence the x-ray tube current are adjustable via an adjustment member 28. The ignition pulses for the thyristors 11 through 14 are supplied by a control device 29. In order to adjust the x-ray tube voltage, the ratio of the operating frequency to the natural (or characteristic) frequency of the inverter can be altered.

In order to explain the method of operation of the illustrated x-ray diagnostic generator, let it be initially assumed that a high x-ray tube current is selected by means of adjustment member 28 and a low x-ray tube voltage is adjusted via the control apparatus 29. Accordingly, the changeover switching means 23, 24, assume their position indicated by the fully drawn lines. If thyristor 11 is ignited, capacitor 10 is charged with the indicated polarity by capacitor 8; namely, to a voltage which, due to the oscillatory circuit consisting of capacitor 10 and inductance 19, lies above the voltage of capacitor 8. Following completion of the charging operation, thyristor 11 is extinguished and capacitor 10 discharges to the voltage of capacitor 8 via the bypass diode 15. Accordingly, there is connected to the primary winding 4 a half-wave of an a.c. voltage. The second, oppositely polarized half-wave follows when, subsequent to the described operations, thyristor 13 is ignited. In so doing, capacitor 10 is charged with the opposite polarity. Since the load current is high, a low loading of the thyristors 11 and 13 is guaranteed if the thyristors 12 and 14 are ignited (or rendered conductive) for the production of the a.c. voltage at primary winding 4. This ignition can proceed simultaneously with thyristors 11 and 13; i.e., thyristors 11 and 12 and thyristors 13 and 14 can always be simultaneously ignited, respectively. However, it is also possible, alternately, for example, to first suquentially ignite thyristors 11 and 13 for the production of a first full-wave, subsequently the thyristors 12 and 14 for the production of the next full-wave, then again thyristors 11 and 13, etc. In the case of each of the described modes of operation, a low loading of the thyristors results.

If a high x-ray tube voltage and a low x-ray tube current are selected, the changeover switching means 23, 24 are changed over into their position indicated by broken lines. In this instance, thyristors 11 through 14 with the associated components form a full-bridge in the diagonal of which capacitor 10 is disposed. If, for example, thyristors 11 and 14 are first ignited, capacitor 10 with the indicated polarity is charged; namely, to a voltage which lies above the sum (or total) voltage of capacitors 8 and 9. Upon termination of the charging operation thyristors 11 and 14 are extinguished, and capacitor 10 discharges, via bypass diodes 15, 18, to the sum voltage of capacitors 8, 9. Subsequently, for the production of an opposite half-wave, the thyristors 12 and 13 are ignited, then again the thyristors 11 and 14, etc. In this instance, two thyristors 11, 14, or 12, 13, respectively, are connected in series, such that only half the voltage is connected to each of the thyristors with respect to the instance in which only a half-bridge is employed.

Due to the changeover switching of the inverter between full- and half-bridge operation, it is possible to construct the inverter from components which can be dimensioned for comparatively low values with regard to the current-load capacity as well as the voltage-load capacity.

The adaptation of the inverter to the load by means of changeover switching between full- and half-bridge operation has been described on the basis of a circuit version wherein a capacitor 10 is connected in parallel with the load.

The invention is also applicable to other interconnections of load and oscillatory capacitor. For example, the inverter in a full- and a half-bridge circuit could also operate, instead of on the parallel connection of load and capacitor 10, on a series-connection of primary winding and an oscillatory capacitor. The oscillatory capacitor can also be disposed as a stray capacitance on the secondary side of the high voltage transformer.

It will be apparent that many modifications and variations may be effected without departing from the scope of the novel concepts and teachings of the present invention.

I claim as my invention:

1. An x-ray diagnostic generator comprising an x-ray tube, a high voltage transformer feeding the x-ray tube, an inverter connected to the input of the high voltage transformer, a DC source comprising a rectifier energized by AC mains, said DC source having respective poles for feeding the inverter, characterized in that the d.c. voltage source (8, 9) has an output conductor (25) with an electric potential midway between the electric potentials of the respective poles thereof, the inverter (5) has a pulsing means (11 through 22) for alternately connecting said transformer input with the poles of the d.c. voltage source (8, 9), said pulsing means including two branch circuits each extending between said poles and having respective midpoints, and in that changeover switching means (23, 24) are present by means of which said transformer input in a first switching condition of the switching means is connected between said output conductor (25) of the d.c. voltage source (8, 9) and the midpoints of the branch circuits which are connected together and in a second switching condition of said switching means is connected between the midpoints of said branch circuits which are disconnected from each other the change-over switching means (23, 24) in said second switching condition connecting said branch circuits so that said transformer is simultaneously energized by both poles of the DC source, and in said first switching configuration connecting the midpoints of the branch circuits (11, 15, 19; 13, 17, 21; and 12, 16, 20; 14, 18, 22) so that said transformer is alternately energized by each pole of said DC source.

2. An x-ray diagnostic generator according to claim 1, characterized in that one inductance each (19 through 22) and a switch (11 through 14) of the pulsing means (11 through 22) form an arm, two such arms forming each branch circuit of the pulsing means.